(12) United States Patent
Miyamoto

(10) Patent No.: US 6,700,629 B1
(45) Date of Patent: Mar. 2, 2004

(54) VIDEO INTERMEDIATE FREQUENCY PROCESSING APPARATUS

(75) Inventor: Hiroki Miyamoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 466 days.

(21) Appl. No.: 09/713,011

(22) Filed: Nov. 16, 2000

(30) Foreign Application Priority Data

Jul. 6, 2000 (JP) .................................. 2000-205470

(51) Int. Cl.[7] ............................................ H04N 5/50
(52) U.S. Cl. .................. 348/735; 348/731; 455/192.2; 455/192.3
(58) Field of Search .................. 348/735, 731, 348/732, 733, 725, 726, 737; 455/192.1, 192.2, 192.3, 189.1, 182.1, 182.2, 182.3; H04N 5/50

(56) References Cited

U.S. PATENT DOCUMENTS

| 4,261,016 A | * | 4/1981 | Hongu et al. | 348/735 |
| 4,263,675 A | * | 4/1981 | Hongu et al. | 455/192.3 |
| 4,855,835 A | * | 8/1989 | Tobita | 348/735 |
| 5,329,319 A | * | 7/1994 | Sgrignoli | 348/733 |
| 6,363,042 B1 | * | 3/2002 | Sakashita | 369/47.28 |

FOREIGN PATENT DOCUMENTS

| JP | 62-39916 | 2/1987 |
| JP | 1-115220 | 5/1989 |
| JP | 6-326600 | 11/1994 |
| JP | 7-221636 | 8/1995 |

OTHER PUBLICATIONS

U.S. patent application Ser. No. 09/708,446, Tachibana et al., filed Nov. 9, 2000.

* cited by examiner

Primary Examiner—Michael Lee
(74) Attorney, Agent, or Firm—Leydig, Voit & Mayer, Ltd.

(57) ABSTRACT

When adjusting a free-running frequency of a voltage controlled oscillator, the video intermediate frequency processing apparatus receives a VIF-DEFEAT signal to a VIF-AMP to minimize gain of the VIF-AMP, and thereby, the VCO is placed into a free-running state. The VIF-DEFEAT signal is also used to turn off a switch, thereby preventing the detection result such as a weak electric field of a video detection signal by an IF-AGC circuit from being input into an AFT-DEFEAT circuit. Therefore, in an automatic frequency tuning circuit, it is possible to take a free-running frequency of the VCO converted into a direct current from a pad.

8 Claims, 3 Drawing Sheets

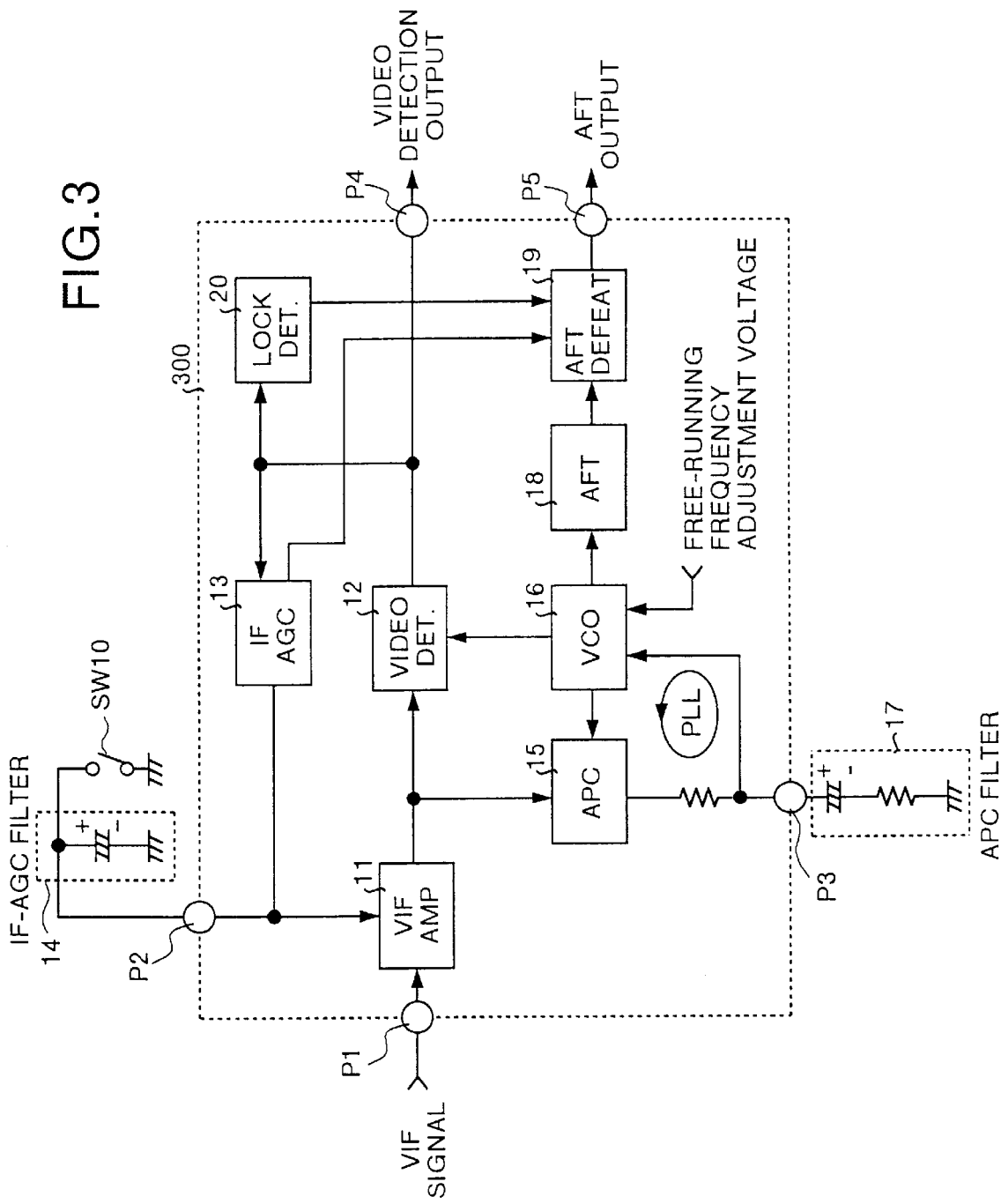

VIDEO INTERMEDIATE FREQUENCY PROCESSING APPARATUS

FIELD OF THE INVENTION

The present invention relates to a video intermediate frequency processing apparatus which performs video detection in a television receiver.

BACKGROUND OF THE INVENTION

In general, a television signal is tuned to a desired channel by a tuner which functions as a television receiver, and thereafter, is converted into a video intermediate frequency signal on the basis of an oscillation frequency of a local oscillator circuit so that a prescribed video intermediate frequency $f_0$ (e.g., in Japan, $f_0$=58.75 MHz, and in U.S., $f_0$=45.75 MHz) is transmitted as a carrier wave. So, in the television receiver, an AFT (Automatic Frequency Tuning) circuit detects a shift between a carrier frequency of a video intermediate frequency outputted from a tuner and the video intermediate frequency $f_0$ so that an oscillation frequency obtained by the local oscillator circuit becomes a true video intermediate frequency, and then, feeds the detection result back to the local oscillator circuit of the tuner. In the manner as described above, a frequency of the video intermediate signal outputted from the tuner is coincident with a video intermediate frequency.

The tuner can stably output a video intermediate signal using this feedback control, and then, the outputted video intermediate signal is inputted to a next-stage video intermediate frequency processing apparatus. The video intermediate frequency processing apparatus is an apparatus for video detection with respect to the inputted video intermediate signal. In general, the video intermediate frequency processing apparatus includes various circuits such as an AFT circuit for carrying out the above feedback control.

The following is a description a construction and operation of a conventional video intermediate frequency processing apparatus. FIG. 3 is a block diagram schematically showing a construction of a conventional video intermediate frequency processing apparatus 300. In general, the video intermediate frequency processing apparatus is realized by an IC (Integrated Circuit), and employs a video detection system using a PLL (Phase-Locked Loop). In order to simplify the explanation, parts of the IC having no relation with the present invention are omitted from the figure.

The conventional video intermediate frequency processing apparatus 300 receives a video intermediate signal (VIF signal) in a VIF-AMP 11 such as an AGC (Auto Gain Control) amplifier via a pad P1. In this case, the inputted video intermediate signal is outputted from a tuner (not shown), and thereafter, is inputted to an intermediate frequency filter (not shown) such as a SAW (Surface Acoustic Wave) filter or the like, and thereby, becomes a signal which is in a state of removing unnecessary signals of adjacent channels.

A signal passing through the VIF-AMP 11 is inputted to a video signal detection circuit (VIDEO-DET.) 12, and then, a video AM detection is made herein. Then, a video detection signal (VIDEO detection output), which is the detection result of the VIDEO-DET. 12, is outputted via a pad P4, and thus, is inputted to an IF-AGC circuit 13.

The IF-AGC circuit 13 is a circuit for detecting a synchronizing amplitude, and operating the VIF-AMP 11 so that a video detection signal always has a constant level. More specifically, the VIF-AMP 11 receives the detection result of the IF-AGC circuit 13 as an AGC voltage, and thereby, even if an amplitude of a VIF signal inputted to the video intermediate frequency processing apparatus changes, it is possible to make the signal constant after video AM detection. In this case, a signal outputted from the IF-AGC circuit 13 is connected to an IF-AGC filter 14, which functions as a low-pass filter, via a pad P2, and is integrated to a sufficient DC (direct current) voltage as an AGC voltage of the VIF-AMP 11.

Moreover, as shown in FIG. 3, a PLL is composed of a phase detector (APC) 15, a voltage control oscillator (VCO) 16, and an APC filter 17 which is connected via a pad P3 and functions as a low-pass filter, and generates a signal having the same frequency and phase as a carrier-wave of the VIF signal. The above VIDEO-DET. 12 receives a signal generated by the PLL, that is, an output signal from the VCO 16 for synchronous detection, and thus, can output a base-band video detection signal which is a detection output.

The output signal of the VCO 16 constituting the above PLL is also inputted to an AFT circuit 18. As described before, the AFT circuit 18 is a circuit which detects a shift between a carrier frequency of the VIF signal and the video intermediate frequency $f_0$, and outputs a DC voltage in accordance with the shift. The function and operation of the AFT circuit itself have been generally widely known; therefore, the details are omitted.

In this case, as the AFT circuit 18, it is preferable to use the prior invention "AFT circuit" made by the same invention who made the present invention. The prior invention "AFT circuit" compares an output signal frequency of the above VCO 16 with a reference signal frequency produces by a stable oscillator, such as a crystal oscillator circuit or the like, and thereby, realizes stable AFT operation without depending upon dispersion factors such as an offset of component circuit and temperature characteristic.

For example, when the output signal frequency of the VCO 16 is equal to the video intermediate frequency $f_0$, the aforesaid AFT circuit 18 outputs a voltage Vcc/2 (Vcc: supply voltage) On the other hand, when the output signal frequency of the VCO 16 is lower than the video intermediate frequency $f_0$, the aforesaid AFT circuit 18 outputs a DC voltage higher than Vcc/2; conversely, when the output signal frequency of the VCO 16 is higher than the video intermediate frequency $f_0$, the aforesaid AFT circuit 18 outputs a DC voltage lower than Vcc/2, in accordance with a shift of frequency.

The DC voltage outputted from the AFT circuit 18 is inputted to an AFT-DEFEAT circuit 19. The AFT-DEFEAT circuit 19 is a circuit for preventing a malfunction of the AFT circuit 18, and makes a decision whether or not a DC voltage outputted from the AFT circuit 18 should be outputted as an AFT voltage via a pad P5. In this case, the IF-AGC circuit 13 can detect a weak electric field state and a no-signal state of the video detection signal. Moreover, a lock detector (LOCK-DET.) 20 shown in FIG. 3 is a circuit which receives a video detection signal of being the detection result of the VIDEO-DET. 12, and detects a state that the PLL is unlocked.

The AFT-DEFEAT circuit 19 inputs the detection result outputted from the IF-AGC circuit 13 and LOCK-DET. circuit 20, and then, in the case where the input detection result shows a weak electric field state, no signal state or a state that the above PLL is unlocked, fixedly outputs ½ Vcc as an AFT voltage without outputting the DC voltage outputted from the AFT circuit 18 as the AFT voltage.

The video intermediate frequency processing apparatus has the circuit configuration as described above, and thereby, realizes a video detection and a stable video intermediate signal output from a tuner. However, a free-running frequency of the VCO 16 has a dispersion to some degree in an IC manufacturing process; for this reason, the free-running frequency needs to be adjusted so as to become the same as the video intermediate frequency $f_0$. In particular, the adjustment must be accurately made in order to secure a pull-in frequency range of the PLL and to prevent a characteristic deterioration of video detection output due to a static phase error.

Usually, the adjustment of the free-running frequency is made in the following manner. More specifically, first, a VIF signal is put in a no-signal state, and as shown in FIG. 3, a switch SW 10 for grounding the pad P2 connected to the IF-AGC filter 14 is turned on, thereby, making minimum a gain of the VIF-AMP 11, that is, a state having no influence from a disturbance. In this state, a free-running frequency control voltage inputted to the VCO 16 is changed while measuring a signal component frequency of the VCO 16 slightly leaking from the pad P4, and thus, the adjustment of frequency is made.

However, according to the aforesaid free-running frequency adjusting method, in order to measure the frequency, an expensive measuring instrument such as a spectrum analyzer must be connected to the pad P4. For this reason, in a TV set manufacture line, there is a problem that it is difficult to make an adjustment of free-running frequency. In this case, as means for supplying a free-running frequency control voltage, in recent years, there are many cases where of converting an adjustment signal from an external microcomputer into a DC signal using A/D converter used in a bus/interface circuit in the IC, and thereafter, supplying the adjustment signal.

SUMMARY OF THE INVENTION

It is an object of the present invention to provide a video intermediate frequency processing apparatus which can readily adjust a free-running frequency of a VCO constituting a PLL.

In order to solve the above problem and to achieve the above object, the video intermediate frequency processing apparatus according to one aspect of the present invention comprises an amplifying unit for amplifying a video intermediate signal outputted from a tuner, and for making minimum its gain in accordance with an input of invalid signal; a phase locked loop unit including; a voltage control oscillator circuit which outputs an output signal having an oscillation frequency in accordance with a control voltage and changes a free-running frequency in accordance with a free-running frequency adjustment voltage; and a phase detector circuit which makes a phase detection between the video intermediate signal amplified by the amplifying unit and the output signal, and inputting a signal obtained on the basis of the phase detection result of the phase detector circuit to the voltage control oscillator circuit as the control voltage; a video signal detecting unit for making a video detection with respect to the video intermediate signal amplified by the amplifying unit using the output signal so as to output a video detection signal; an automatic frequency tuning unit for converting a frequency change of the output signal into a direct current voltage, and for outputting the direct current voltage as a temporary voltage for a feedback input to the tuner so that a frequency of the video intermediate signal becomes a predetermined video intermediate frequency; a video detection signal detecting unit for detecting a weak electric field state or no signal state of the video detection signal so as to output an abnormal signal; an automatic frequency tuning voltage generating unit for generating and outputting an automatic frequency tuning voltage fed back and inputted to the tuner on the basis of the temporary voltage, while outputting a predetermined automatic frequency tuning voltage when the abnormal signal is inputted; and a switching unit for preventing the abnormal signal from being inputted to the automatic frequency tuning voltage generating unit in accordance with the invalid signal.

According to the present invention, in the case of adjusting a free-running frequency of a voltage control oscillator circuit, an invalid signal (equivalent to a VIF-DEFEAT signal which will be described later) is inputted to an amplifier unit so as to make minimum a gain of the amplifier unit, and thereby, it is possible to fully set the voltage control oscillator circuit to a free-running state. Moreover, at that time, a switching unit is made into an off state by the invalid signal, and thereby, the detection result (abnormal signal) of a video detection signal detecting unit is prevented from being inputted to an automatic frequency tuning voltage generating unit. Therefore, it is possible to obtain a direct voltage indicative of a difference between a free-running frequency and a video intermediate frequency from the automatic frequency tuning voltage generating unit.

The video intermediate frequency processing apparatus according to one aspect of the present invention comprises an amplifying unit for amplifying a video intermediate signal outputted from a tuner, and for making minimum its gain in accordance with an input of invalid signal; a phase locked loop unit including; a voltage control oscillator circuit which outputs an output signal having an oscillation frequency in accordance with a control voltage and changes a free-running frequency in accordance with a free-running frequency adjustment voltage; and a phase detector circuit which makes a phase detection between the video intermediate signal amplified by the amplifying unit and the output signal, and inputting a signal obtained on the basis of the phase detection result of the phase detector circuit to the voltage control oscillator circuit as the control voltage; a video signal detecting unit for making a video detection with respect to the video intermediate signal amplified by the amplifying unit using the output signal so as to output a video detection signal; an automatic frequency tuning unit for converting a frequency change of the output signal into a direct current voltage, and for outputting the direct current voltage as a temporary voltage for a feedback input to the tuner so that a frequency of the video intermediate signal becomes a predetermined video intermediate frequency; a video detection signal detecting unit for detecting a weak electric field state or no signal state of the video detection signal so as to output an abnormal signal; an automatic frequency tuning voltage generating unit for generating and outputting an automatic frequency tuning voltage fed back and inputted to the tuner on the basis of the temporary voltage, while outputting a predetermined automatic frequency tuning voltage when the abnormal signal is inputted; a first switching unit for preventing the abnormal signal from being inputted to the automatic frequency tuning voltage generating unit in accordance with the invalid signal; and a second switching unit for preventing the control voltage from being inputted to the voltage control oscillator circuit in accordance with the invalid signal.

According to the present invention, in the case of adjusting a free-running frequency of a voltage control oscillator circuit, an invalid signal (equivalent to an SW control signal which will be described later) is inputted to a second switching unit, and thereby, no control voltage is inputted to the voltage control oscillator circuit; therefore, it is possible to fully set the voltage control oscillator circuit to a free-running state. Moreover, at that time, a first switching unit is made into an off state by the invalid signal, and thereby, the detection result (abnormal signal) of a video detection signal detecting unit is prevented from being inputted to an automatic frequency tuning voltage generating unit. Therefore, it is possible to obtain a direct voltage indicative of a difference between a free-running frequency and a video intermediate frequency from the automatic frequency tuning voltage generating unit.

Further, a change of the free-running frequency is obtained as a change of the direct current voltage, and the invalid signal is inputted via the bus. Therefore, it is possible to read the direct current voltage outputted from the automatic frequency tuning voltage generating unit by a microcomputer, and to easily make an automatic adjustment of the free-running frequency.

Further, the free-running frequency adjustment voltage is selected as a fixed bias value by a zapping unit, and thereby, a wafer stage of chip before mold sealing, an adjustment of free-running frequency according to the present invention is carried out, and then, the free-running frequency is trimmed to some degree.

Further, the voltage control oscillator circuit can be provided with an ordinary metal fuse or Zener diode as the zapping unit; therefore, it is possible to readily perform zapping.

Other objects and features of this invention will become apparent from the following description with reference to the accompanying drawings.

BRIEF DESCRIPTION OF THE DRAWINGS

FIG. 3 is a block diagram schematically showing a construction of a conventional video intermediate frequency processing apparatus.

DESCRIPTION OF THE PREFERRED EMBODIMENTS

Preferred embodiments of a video intermediate frequency processing apparatus according to the present invention will be described below with reference to the accompanying drawings. However, this invention is not limited to the following preferred embodiments.

A video intermediate frequency processing apparatus according to a first embodiment will be explained here. According to the first embodiment, the video intermediate frequency processing apparatus has the following features. That is, in the case of adjusting a free-running frequency, the video intermediate frequency processing apparatus can make minimum a gain of the VIF-AMP 11 constituting the conventional video intermediate frequency processing apparatus in accordance with a signal inputted via the above bus/interface circuit. Further, the video intermediate frequency processing apparatus can prevent the detection result of the IF-AGC circuit 13 from being inputted to the AFT-DEFEAT circuit 19 in accordance with the signal, and thereby, uses an AFT voltage outputted from the AFT-DEFEAT circuit 19 for confirmation of adjustment.

Figure 1:
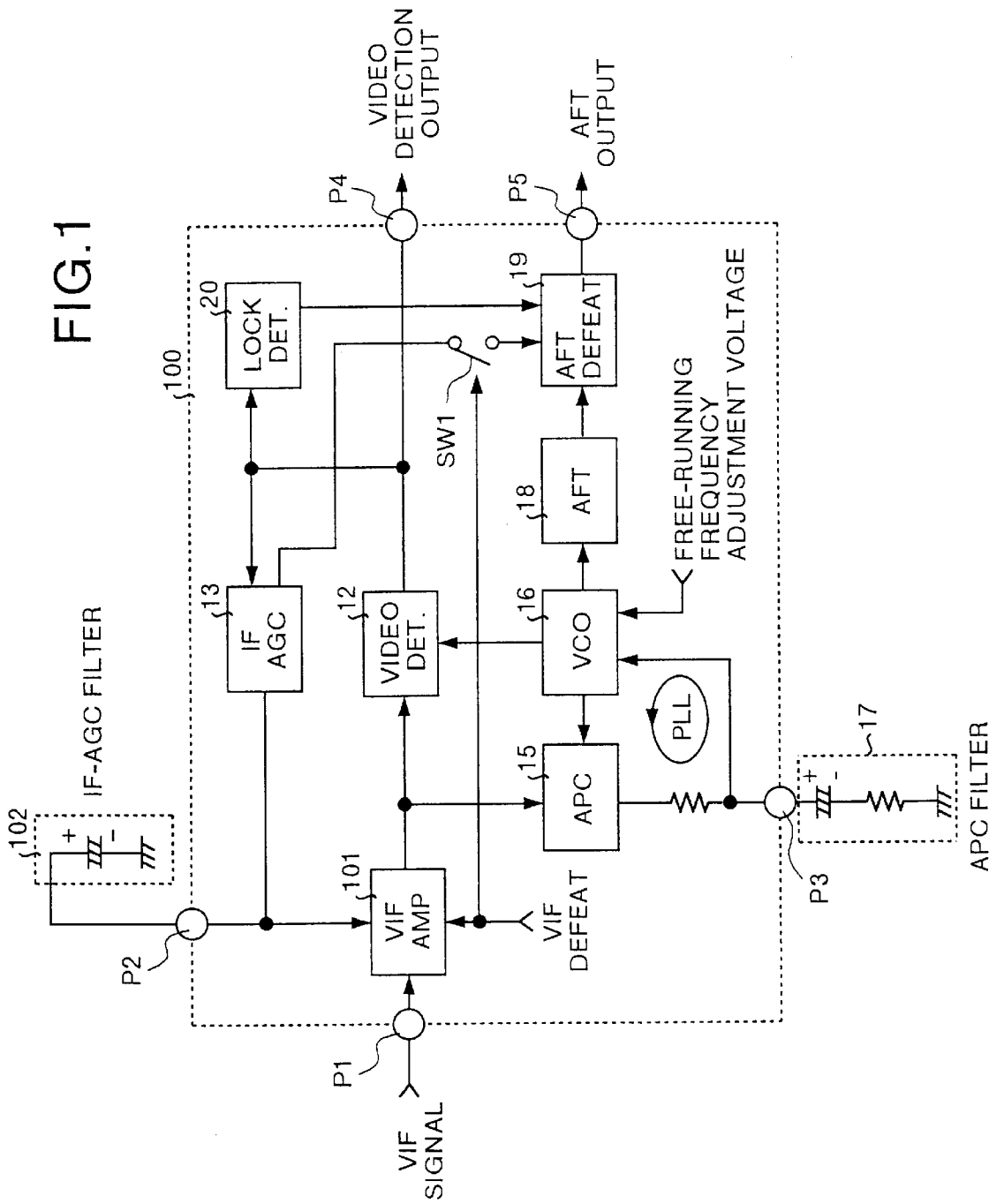
FIG. 1 is a block diagram schematically showing a construction of a video intermediate frequency processing apparatus according to a first embodiment of the present invention.

FIG. 1 is a block diagram schematically showing a construction of a video intermediate frequency processing apparatus 100 according to a first embodiment of the present invention. Like reference numerals are used to designate parts common to FIG. 3, and their explanation is omitted. The video intermediate frequency processing apparatus 100 shown in FIG. 1 is composed of a VIF-AMP 101 for amplifying a VIF signal inputted via a pad P1, a video signal detection circuit (VIDEO-DET.) 12, an IF-AGC circuit 13, an APC 15, a VCO 16, an AFT circuit 18, an AFT-DEFEAT circuit 19, a lock detector (LOCK-DET.) 20, and a switch SW1.

Specifically, the VIF-AMP 101 has a VIF-DEFEAT function of making its gain minimum in accordance with a mode signal (VIF-DEFEAT signal) inputted from the outside via a bus/interface circuit (not shown). Whereby there is no need of providing a switch for grounding an AGC voltage on the outside, like the conventional case.

The switch SW1 is arranged on a transmission line for transmitting the detection result of weak electric field by the IF-AGC circuit 13 to the AFT-DEFEAT circuit 19, and in an off state, prevents the above detection result from being inputted to the AFT-DEFEAT circuit 19. In this case, the switch SW1 transfers to an off state by an input of the above VIF-DEFEAT signal.

Next, operation and adjusting method in adjusting a free-running frequency of the video intermediate frequency processing apparatus 100 will be explained. First, when a VIF-DEFEAT signal is inputted to the VIF-AMP 101 via the bus/interface circuit (not shown), a gain of the VIF-AMP 101 becomes minimum, and then, the VCO 16 becomes a free-running state.

In this case, in a conventional circuit configuration, a signal level outputted from the VIF-AMP 101 becomes low, and simultaneously, a video detection signal level of the VIDEO-DET. 12 becomes low. For this reason, the IF-AGC circuit 13 detects this state as a weak electric field state or no signal state, and thereby, the AFT-DEFEAT circuit 19 is operated; as a result, an AFT voltage is fixed to Vcc/2.

In view of the above problem, in the video intermediate frequency processing apparatus according to this first embodiment, in order to prevent the AFT voltage from being fixed to Vcc/2 in adjusting a free-running frequency, the above VIF-DEFEAT signal is inputted to the switch SW1 so as to make a VIF-DEFEAT function invalid. By doing so, when adjusting a free-running frequency, it is possible to measure a DC voltage outputted from the AFT circuit 18 by a pad P5.

At this time, in the case where the PLL is unlocked and a beat signal is outputted from the VIDEO-DET. 12, the LOCK-DET. 20 makes a decision whether the PLL is in a lock state by using the factor that a peak DC value of the beat signal waveform becomes higher than a DC value in a no-signal state. Therefore, in a VIF-DEFEAT state such that the same DC as no-signal state is outputted, the LOCK-DET. 20 makes a decision that the PLL is in a locked state, and thus, no unlock state signal is inputted to the AFT-DEFEAT circuit 19.

On the other hand, the AFT circuit 18 outputs a difference between an oscillation frequency of the VCO 16 and the video intermediate frequency $f_0$ as a DC voltage corresponding to the difference, in the same manner as the aforesaid conventional operation. So, in this first embodiment, the above DC voltage is used to confirm an adjustment of a free-running frequency of the VCO 16.

Namely, the VIF-DEFEAT function is operated, and thereby, the VCO 16 fully becomes a free-running state. At this time, a difference between the free-running frequency and the video intermediate frequency $f_0$ is outputted as a DC voltage from the pad PS. Therefore, the DC voltage is measured, and thereby, it is possible to set a free-running frequency adjustment voltage inputted to the VCO 16 to a suitable value.

More specifically, a free-running frequency adjustment voltage is selected so that the DC voltage outputted from the pad P5 becomes Vcc/2, and thereby, it is possible to accurately set the free-running frequency to the video intermediate frequency $f_0$.

As described above, in the video intermediate frequency processing apparatus according to this first embodiment, in the case of adjusting the free-running frequency, the VIF-DEFEAT signal is inputted to the VIF-AMP 101, and thereby, a gain of the VIF-AMP 101 is made minimum; therefore, it is possible to fully set the VCO 16 to a free-running state. Moreover, at that time, the switch SW1 is turned off, and thereby, it is possible to prevent the detection result of the IF-AGC circuit 13 from being inputted to the AFT-DEFEAT circuit, and to obtain the difference between the free-running frequency and the video intermediate frequency $f_0$ as a DC voltage from the pad P5. By doing so, even if an expensive spectrum analyzer or the like is not used, a simple measuring instrument such as an ordinary voltmeter and an oscilloscope is connected to the pad P5, and thereby, it is possible to very easily measure the difference of frequency.

Moreover, a change of the free-running frequency is obtained as a change of the DC voltage, and the above VIF-DEFEAT function is developed in accordance with the VIF-DEFEAT signal inputted via the bus/interface circuit (not shown). Therefore, the DC voltage outputted from the pad P5 is read by a microcomputer, and thereby, it is possible to make an automatic adjustment of free-running frequency. Further, there exists an IC having a construction such that an AFT voltage is outputted via a bus; therefore, it is also possible to make the above automatic adjustment by using the AFT voltage transmitted onto the bus.

Like the conventional video intermediate frequency processing apparatus, as means for supplying a free-running frequency adjustment voltage, the adjustment signal from an external microcomputer may be converted into a DC voltage by an A/D converter used in the bus/interface circuit included in the IC, and thereafter, the DC voltage may be supplied.

Second Embodiment

Next, a video intermediate frequency processing apparatus according to a second embodiment will be explained. According to the second embodiment, the video intermediate frequency processing apparatus has the following features. That is, in the case of adjusting a free-running frequency, the video intermediate frequency processing apparatus can prevent a control voltage outputted from an APC from being inputted to a VCO in accordance with an SW control signal inputted via the above bus/interface circuit in a PLL constituting the conventional video intermediate frequency processing apparatus. Further, the video intermediate frequency processing apparatus can prevent the detection result of the IF-AGC circuit 13 from being inputted to the AFT-DEFEAT circuit 19 in accordance with the SW control signal, and thereby, uses an AFT voltage outputted from the AFT-DEFEAT circuit 19 for confirmation of adjustment.

Figure 2:
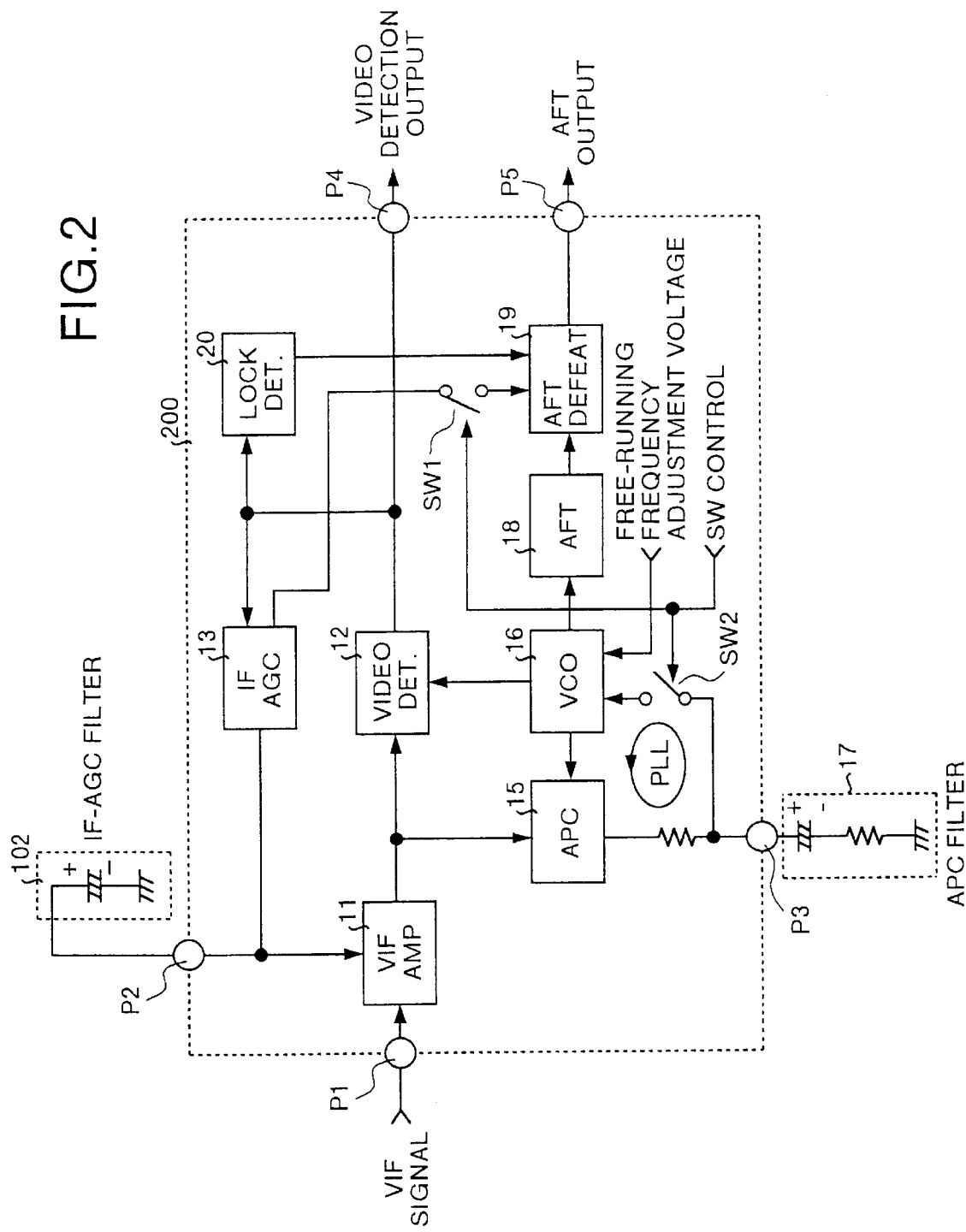
FIG. 2 is a block diagram schematically showing a construction of a video intermediate frequency processing apparatus according to a second embodiment of the present invention.

FIG. 2 is a block diagram schematically showing a construction of a video intermediate frequency processing apparatus 200 according to a second embodiment of the present invention. Like reference numerals are used to designate parts common to FIG. 3, and their explanation is omitted. The video intermediate frequency processing apparatus 200 is composed of a VIF-AMP 11 for amplifying a VIF signal inputted via a pad P1, a video signal detection circuit (VIDEO-DET.) 12, an IF-AGC circuit 13, an APC 15, a VCO 16, an AFT circuit 18, an AFT-DEFEAT circuit 19, a lock detector (LOCK-DET.) 20, a switch SW1, and a switch SW2.

Specifically, like the first embodiment, the switch SW1 is arranged on a transmission line for transmitting the detection result of weak electric field by the IF-AGC circuit 13 to the AFT-DEFEAT circuit 19, and in an off state, prevents the above detection result from being inputted to the AFT-DEFEAT circuit 19. In this case, the switch SW1 transfers to an off state by a mode signal (SW control signal) inputted from the outside via the bus/interface circuit (not shown).

Further, a switch SW2 is arranged on a transmission line for inputting a control voltage outputted from the APC 15 to the VCO 16, and in an off state, prevents the control voltage from being inputted to the VCO 16. In this case, the switch SW2 transfers to an off state by an input of the above SW control signal, together with the switch SW1.

Namely, when the switch SW2 becomes an off state, no control voltage is inputted to the VCO 16, and thereby, the purpose is achieved, that is, the VCO 16 fully becomes a free-running state. Therefore, there is no need of providing a switch for grounding an AGC voltage onto the outside.

Next, operation and adjusting method in adjusting a free-running frequency of the video intermediate frequency processing apparatus 200 will be explained. First, when an SW control signal is inputted to the switch SW2 via the bus/interface circuit (not shown), a connection between a control voltage output terminal of the APC 15 and a control voltage input terminal of the VCO 16 is released; therefore, the VCO 16 fully becomes a free-running state. In this case, in adjusting the free-running frequency, no VIF signal is inputted to the pad P1.

Therefore, the VIDEO-DET. 12 can not correctly carry out a detection operation, and then, an outputted video detection signal level becomes low. For this reason, in the conventional circuit configuration, the IF-AGC circuit 13 detects the above state as a weak electric field state or no signal state, and then, the AFT-DEFEAT circuit 19 is operated; as a result, an AFT voltage is fixed to Vcc/2.

Like the first embodiment, in the video intermediate frequency processing apparatus according to this second embodiment, in order to prevent the AFT voltage from being fixed to Vcc/2 in adjusting a free-running frequency, the above SW control signal is inputted to the switch SW1 so as to make an AFT-DEFEAT function invalid. By doing so, when adjusting a free-running frequency, it is possible to measure a DC voltage outputted from the AFT circuit 18 by a pad P5.

At this time, like the first embodiment, the LOCK-DET. 20 makes a decision such that the VIF-DEFEAT state of outputting the same DC as the no signal state is regarded as a lock state, and thus, no unlock state signal is inputted to the AFT-DEFEAT circuit 19.

On the other hand, the AFT circuit 18 outputs a difference between an oscillation frequency of the VCO 16 and the video intermediate frequency $f_0$ as a DC voltage corresponding to the difference, in the same manner as the aforesaid conventional operation. So, in this second embodiment, the above DC voltage is used to confirm an adjustment of a free-running frequency of the VCO 16, like the above first embodiment.

As described above, in the video intermediate frequency processing apparatus according to the second embodiment, in the case of adjusting the free-running frequency, the switch SW2 is set to an off state in accordance with the SW control signal inputted via the above bus/interface circuit, and thereby, the control voltage outputted from the APC 15 is prevented from being inputted to the VCO 16; therefore, it is possible to fully set the VCO 16 to a free-running state. Moreover, at that time, the switch SW1 is turned off, and thereby, it is possible to prevent the detection result of the IF-AGC circuit 13 from being inputted to the AFT-DEFEAT circuit 19, and to obtain the difference between the free-running frequency and the video intermediate frequency $f_0$ as a DC voltage from the pad PS. By doing so, even if an expensive spectrum analyzer or the like is not used, a simple measuring instrument such as an ordinary voltmeter and an oscilloscope is connected to the pad P5, and thereby, it is possible to very easily measure the difference of frequency.

Moreover, a change of the free-running frequency is obtained as a change of the DC voltage, and the above SW control signal is inputted via the bus/interface circuit (not shown) Therefore, the DC voltage outputted from the pad P5 is read by a microcomputer, and thereby, it is possible to make an automatic adjustment of free-running frequency. Further, there exists an IC having a construction such that an AFT voltage is outputted via a bus; therefore, it is also possible to make the above automatic adjustment by using the AFT voltage transmitted onto the bus.

Like the conventional video intermediate frequency processing apparatus, as means for supplying a free-running frequency adjustment voltage, the adjustment signal from an external microcomputer may be converted into a DC voltage by an A/D converter used in the bus/interface circuit included in the IC, and thereafter, the DC voltage may be supplied.

Third Embodiment

Next, a video intermediate frequency processing apparatus according to a third embodiment will be explained. According to the third embodiment, the video intermediate frequency processing apparatus has the following features. More specifically, in the case of adjusting a free-running frequency, in the first and second embodiments, a free-running frequency adjustment voltage inputted to the VCO 16 is set as a fixed bias value, and then, it is possible to trim the fixed bias value to some degree by zapping in a wafer stage of chip before mold sealing.

So, the above zapping will be described below. Conventionally, in a semiconductor such as an LSI, in order to improve a yield of product or to have various functions as option, various adjustment circuits are incorporated into an IC. Zapping is one of trimming methods by the adjustment circuit, and makes use of a breakdown of a Zener diode and a metal fuse which are zapping elements.

In this third embodiment, first, several Zener diodes are connected in parallel for each resistor for determining a fixed bias value which is a free-running frequency adjustment voltage. In a wafer test stage on an IC manufacture, an excessive power is applied in a reverse direction between a pn-junctions of a desired Zener diode while measuring an AFT voltage according to the methods described in the above first and second embodiments, and in this manner, the Zener diode is broken down, and thereby, a value of resistors connected in parallel is equivalently set to 0Ω (diode is made into a short-circuit state). By doing so, it is possible to perform trimming of the fixed bias value which is a free-running frequency adjustment voltage.

As described above, in the video intermediate frequency processing apparatus according to the third embodiment, the fixed bias value, which is a free-running frequency adjustment voltage, is trimmed to some degree by providing an adjustment circuit by a Zener zapping method, and by adjusting a free-running frequency on the basis of the above first and second embodiments in a wafer stage of chip before mold sealing. Therefore, there is no need of adjusting a free-running frequency in a finished IC after mold sealing, and thereby, it is possible to contribute to a rationalization on a TV set manufacture.

As is evident from the above description, according to one aspect of the present invention, in the case of adjusting a free-running frequency of a voltage control oscillator circuit, an invalid signal (equivalent to the above VIF-DEFEAT signal) is inputted to an amplifier unit so as to make minimum a gain of the amplifier unit, and thereby, it is possible to fully set the voltage control oscillator circuit to a free-running state. Moreover, at that time, a switching unit is made into an off state by the invalid signal, and thereby, the detection result (abnormal signal) of a video detection signal detecting unit is prevented from being inputted to an automatic frequency tuning voltage generating unit. Therefore, it is possible to obtain a direct voltage indicative of a difference between a free-running frequency and a video intermediate frequency from the automatic frequency tuning voltage generating unit. By doing so, even if an expensive spectrum analyzer or the like is not used like the conventional case, a simple measuring instrument such as an ordinary voltmeter and an oscilloscope is connected to an output terminal of the automatic frequency tuning voltage generating unit, and thereby, it is possible to very easily measure the difference of frequency.

Further, according to another aspect of the present invention, in the case of adjusting a free-running frequency of a voltage control oscillator circuit, an invalid signal (equivalent to the above SW control signal) is inputted to a second switching unit, and thereby, no control voltage is inputted to the voltage control oscillator circuit; therefore, it is possible to fully set the voltage control oscillator circuit to a free-running state. Moreover, at that time, a first switching unit is made into an off state by the invalid signal, and thereby, the detection result (abnormal signal) of a video detection signal detecting unit is prevented from being inputted to an automatic frequency tuning voltage generating unit. Therefore, it is possible to obtain a direct voltage indicative of a difference between a free-running frequency and a video intermediate frequency from the automatic frequency tuning voltage generating unit. By doing so, even if an expensive spectrum analyzer or the like is not used like the conventional case, a simple measuring instrument such as an ordinary voltmeter and an oscilloscope is connected to an output terminal of the automatic frequency tuning voltage generating unit, and thereby, it is possible to very easily measure the difference of frequency.

Further, a change of the free-running frequency is obtained as a change of the direct current voltage, and the invalid signal is inputted via the bus. Therefore, the direct current voltage outputted from the automatic frequency tuning voltage generating unit is read by a microcomputer, and an automatic adjustment work of free-running frequency is possible, and thereby, it is possible to more easily perform an adjustment work of the free-running frequency.

Further, the free-running frequency adjustment voltage is selected as a fixed bias value by a zapping unit, and thereby, a wafer stage of chip before mold sealing, an adjustment of free-running frequency according to the present invention is carried out, and then, the free-running frequency is trimmed to some degree. Therefore, there is no need of adjusting a free-running frequency in a finished IC after mold sealing, and thereby, it is possible to contribute to a rationalization on a TV set manufacture.

Further, the voltage control oscillator circuit can be provided with an ordinary metal fuse or Zener diode as the zapping unit. Therefore, it is possible to readily perform zapping.

Although the invention has been described with respect to a specific embodiment for a complete and clear disclosure, the appended claims are not to be thus limited but are to be construed as embodying all modifications and alternative constructions that may occur to one skilled in the art which fairly fall within the basic-teaching herein set forth.

What is claimed is:

1. A video intermediate frequency processing apparatus comprising:
    an amplifying unit for amplifying a video intermediate signal output from a tuner, and minimizing its gain in response to input of an invalid signal;
    a phase locked loop unit having a voltage control oscillator circuit which outputs an output signal having an oscillation frequency in accordance with a control voltage and changes a free-running frequency in accordance with a free-running frequency adjustment voltage, and a phase detector circuit which detects a phase difference between the video intermediate signal amplified by the amplifying unit and the output signal, and, in response, generating a phase detection signal input into said voltage control oscillator circuit as the control voltage;
    a video signal detecting unit for video detection with respect to the video intermediate signal amplified by said amplifying unit using the output signal and outputting a video detection signal as a result of the video detection;
    an automatic frequency tuning unit for converting a frequency change of the output signal into a direct current voltage, and for outputting the direct current voltage as a temporary voltage for a feedback input to the tuner so that the video intermediate signal has a fixed video intermediate frequency;
    a video detection signal detecting unit for detecting each of a weak electric field state and a no signal state of the video detection signal and, in response, outputting an abnormal signal;
    an automatic frequency tuning voltage generating unit for generating and outputting an automatic frequency tuning voltage fed back and input to the tuner from the temporary voltage, and outputting a fixed automatic frequency tuning voltage when the abnormal signal is received; and
    a switching unit for preventing the abnormal signal from being input into said automatic frequency tuning voltage generating unit in response to input of the invalid signal.

2. The video intermediate frequency processing apparatus according to claim 1 further comprising a bus connected to each of said units, wherein processing modes such as noise reduction processing and Y/C separation processing are set using said bus, and the invalid signal is input via said bus.

3. The video intermediate frequency processing apparatus according to claim 1, wherein said voltage control oscillator circuit includes a zapping unit, and a resistor for determining a free-running frequency adjustment voltage set by zapping.

4. The video intermediate frequency processing apparatus according to claim 3, wherein the zapping unit includes one a metal fuse and a Zener diode.

5. A video intermediate frequency processing apparatus comprising:
    an amplifying unit for amplifying a video intermediate signal output from a tuner, and minimizing its gain in response to input of an invalid signal;
    a phase locked loop unit having a voltage control oscillator circuit which outputs an output signal having an oscillation frequency in accordance with a control voltage and changes a free-running frequency in accordance with a free-running frequency adjustment voltage, and a phase detector circuit which detects a phase difference between the video intermediate signal amplified by the amplifying unit and the output signal, and, in response, generating a phase detection signal input into said voltage control oscillator circuit as the control voltage;
    a video signal detecting unit for video detection with respect to the video intermediate signal amplified by said amplifying unit using the output signal and outputting a video detection signal as a result of the video detection;
    an automatic frequency tuning unit for converting a frequency change of the output signal into a direct current voltage, and for outputting the direct current voltage as a temporary voltage for a feedback input to the tuner so that the video intermediate signal has a fixed video intermediate frequency;
    a video detection signal detecting unit for detecting each of a weak electric field state and a no signal state of the video detection signal and, in response, outputting an abnormal signal;
    an automatic frequency tuning voltage generating unit for generating and outputting an automatic frequency tuning voltage fed back and input to the tuner from the temporary voltage, and outputting a fixed automatic frequency tuning voltage when the abnormal signal is received;
    a first switching unit for preventing the abnormal signal from being input into said automatic frequency tuning voltage generating unit in response to input of the invalid signal; and
    a second switching unit for preventing the control voltage from being input into said voltage control oscillator circuit in response to input of the invalid signal.

6. The video intermediate frequency processing apparatus according to claim 5 further comprising a bus connected to each of said units, wherein processing modes such as noise reduction processing and Y/C separation processing are set using said bus, and the invalid signal is input via said bus.

7. The video intermediate frequency processing apparatus according to claim 5, wherein said voltage control oscillator circuit includes a zapping unit, and a resistor for determining a free-running frequency adjustment voltage set by zapping.

8. The video intermediate frequency processing apparatus according to claim 7, wherein the zapping unit includes one a metal fuse and a Zener diode.

* * * * *